United States Patent
Varma et al.

(10) Patent No.: US 10,909,471 B2
(45) Date of Patent: Feb. 2, 2021

(54) RESOURCE-EFFICIENT MACHINE LEARNING

(71) Applicant: Microsoft Technology Licensing, LLC, Redmond, WA (US)

(72) Inventors: Manik Varma, New Delhi (IN); Ashish Kumar, Delhi (IN)

(73) Assignee: Microsoft Technology Licensing, LLC, Redmond, WA (US)

( * ) Notice: Subject to any disclaimer, the term of this patent is extended or adjusted under 35 U.S.C. 154(b) by 873 days.

(21) Appl. No.: 15/609,958

(22) Filed: May 31, 2017

(65) Prior Publication Data
US 2018/0276564 A1 Sep. 27, 2018

(30) Foreign Application Priority Data

Mar. 24, 2017 (IN) .............................. 201741010547

(51) Int. Cl.
  *G06N 20/00* (2019.01)
  *G06N 5/00* (2006.01)
  *G06K 9/62* (2006.01)
  *G06F 17/16* (2006.01)
  *G06N 5/04* (2006.01)

(52) U.S. Cl.
  CPC ............ *G06N 20/00* (2019.01); *G06F 17/16* (2013.01); *G06K 9/6282* (2013.01); *G06N 5/003* (2013.01); *G06N 5/04* (2013.01)

(58) Field of Classification Search
  CPC .......... G06N 20/00; G06N 5/003; G06N 5/04; G06F 17/16; G06F 7/78; G06K 9/6282
  See application file for complete search history.

(56) References Cited

U.S. PATENT DOCUMENTS

2015/0186775 A1* 7/2015 Cruz Mota ............. G06F 30/20
  706/46
2016/0335534 A1* 11/2016 Nere .................... G06N 3/0445

FOREIGN PATENT DOCUMENTS

CN     105303262 A    2/2016

OTHER PUBLICATIONS

Ronan Collobertt, Deep Learning for Efficient Discriminative Parsing, the 14th International Conference on Artificial Intelligence and Statistics (AISTATS) 2011, Fort Lauderdale, FL, USA. vol. 15 of JMLR:W&CP 15. Copyright 2011 (Year: 2011).*
http://www.mathcs.emory.edu/~cheung/Courses/171/Syllabus/9-BinTree/bin-tree.html, Nov. 2016 (Year: 2016).*

(Continued)

*Primary Examiner* — Kakali Chaki
*Assistant Examiner* — Su-Ting Chuang
(74) *Attorney, Agent, or Firm* — Schwegman Lundberg & Woessner, P.A.

(57) ABSTRACT

Generally discussed herein are devices, systems, and methods for machine-learning. A method may include projecting an input feature vector of a first dimensional space into a second dimensional space to create a lower dimensional feature vector, the second dimensional space smaller than the first dimensional space, determining a first prediction vector for an internal node of the tree, determining whether to pass the first prediction vector to a first child or a second child of the internal node based on a sparse vector and the lower dimensional feature vector, determining a second prediction vector at a leaf node of the tree, and determining an overall prediction by combining the first and second prediction vectors.

20 Claims, 4 Drawing Sheets

(56) References Cited

OTHER PUBLICATIONS

Abu-Elkheir, et al., "Data Management for the Internet of Things: Design Primitives and Solution", In Journal of Sensor, vol. 13, Issue 11, Nov. 2013, pp. 15582-15612.

Diao, et al., "Rethinking Data Management for Storage-centric Sensor Networks", In Journal of Third Biennial Conference on Innovative Data Systems Research, Jan. 7, 2007, 11 pages.

Homuth, et al., "Storage for the Internet of things", http://treelineinteractive.com/blog/storage-for-the-internet-of-things/, Retrieved on: Mar. 17, 2017, 12 pages.

Bahga, et al., "Internet of Things: A Hands-On Approach", In Publication of VPT, Aug. 9, 2014, 1 pages.

Rahmani, et al., "Exploiting smart e-Health gateways at the edge of healthcare Internet-of-Things: A fog computing approach", In Journal of Future Generation Computer Systems, Feb. 10, 2017, pp. 1-46.

Bormann, et al., "Clearing off the Cloud over the Internet of Things", https://web.archive.org/web/20141027134427/https:/www.w3.org/2014/strint/papers/28.pdf, Published on: Oct. 27, 2014, 5 pages.

Guo, et al., "A Mobile Cloud Hierarchical Trust Management Protocol for IoT Systems", In Proceedings of 5th IEEE International Conference on Mobile Cloud Computing, Services, and Engineering, Mar. 17, 2017, 6 pages.

"India Iot", https://www.tatacommunications.com/products-services/enterprises/mobility/india-iot?gclid=CjwKEAJwkq7GBRDun9iu2JjyhmsSJADHCD_HkI5M7WSWjj1mgpiZIHR6cF-aKJqcUOOBMZEOqi1r2xoCBTrw_wcB, Retrieved on: Mar. 17, 2017, 2 pages.

Parkinson, John, "Forecasting the Future of the Internet of Things", http://ww2.cfo.com/forecasting/2015/04/forecasting-future-internet-of-things/, Published on: Apr. 8, 2015, 8 pages.

"The Marinexplore and Cornell University Whale Detection Challenge", https://www.kaggle.com/c/whale-detection-challenge/data, Published on: Mar. 17, 2017, 3 pages.

Ba, et al., "Do deep nets really need to be deep?", In Proceedings of Advances in Neural Information Processing Systems 27, Dec. 8, 2014, 13 pages.

Blumensath, et al., "Iterative thresholding for sparse approximations", In Journal of Fourier Analysis and Applications, vol. 14, Issue 5-6, Dec. 2008, pp. 1-29.

Breiman, Leo, "Random forests", In Journal of Machine learning vol. 45, Issue 1, Jan. 2001, pp. 1-33.

Breiman, et al., "Classification and regression trees", In Publication of CRC press, Jan. 1, 1984, 6 pages.

Bucilua, et al., "Model compression", In Proceedings of the 12th ACM SIGKDD international conference on Knowledge discovery and datamining, Aug. 20, 2006, pp. 535-541.

Burges, Christopher J.C., "From ranknet to lambdarank to lambdamart: An overview", In TechReport of MSR-TR-2010-82, Jun. 23, 2010, pp. 1-19.

Campos, et al., "Character recognition in natural images", In Proceedings of the Fourth International Conference on Computer Vision Theory and Applications, Feb. 8, 2009, 8 pages.

Denton, et al., "Exploiting linear structure within convolutional networks for efficient evaluation", In Proceedings of Advances in Neural Information Processing Systems 27, Dec. 8, 2014, pp. 1-9.

Duda, et al., "Pattern Classification", In Publication of John Wiley and Sons, 2002, 4 pages.

Han, et al., "Deep compression: Compressing deep neural networks with pruning, trained quantization and huffman coding", In Proceedings of International Conference on Learning Representations, May 27, 2016, 14 pages.

Hsieh, et al., "Fast prediction for largescale kernel machines", In Proceedings of Advances in Neural Information Processing Systems, Dec. 8, 2014, pp. 1-9.

Hubara, et al., "Quantized neural networks: Training neural networks with low precision weights and activations", In Journal of Computing Research Repository, Sep. 2016, pp. 1-29.

Hull, J.J, "A database for handwritten text recognition research", In Journal IEEE Transactions on Pattern Analysis and Machine Intelligence, vol. 16, Issue 5, May 1994, pp. 550-554.

Iandola, et al., "Squeezenet: Alexnet-level accuracy with 50x fewer parameters and <1MB model size", In Journal of Computing Research Repository, Feb. 2016, pp. 1-13.

Ioannou, et al., "Deep Roots: Improving CNN Efficiency with Hierarchical Filter Group", In Journal of Computing Research Repository, May 2016, pp. 1-15.

Ioannou, et al., "Decision Forests, Convolutional Networks and the Models in-Between", In Journal of Computing Research Repository, Mar. 2016, 9 pages.

Jain, et al., "On iterative hard thresholding methods for high-dimensional m-estimation", In Proceedings of Annual Conference on Neural Information Processing Systems, Dec. 8, 2014, pp. 1-20.

Joly, et al., "L1-based compression of random forest models", In Proceedings of European Symposium on Artificial Neural Networks, Computational Intelligence and Machine Learning, Apr. 25, 2012, pp. 375-380.

Jose, et al., "Local deep kernel learning for efficient non-linear SVM prediction", In Proceedings of the 30th International Conference on Machine Learning, vol. 28, Jun. 16, 2013, 9 pages.

Kasprowski, et al., "Eye movement in biometrics", In Proceedings of European Conference on Computer Vision, May 15, 2004, pp. 1-12.

Kontschieder, et al., "Deep neural decision forests", In Proceedings of IEEE International Conference on Computer Vision, Dec. 7, 2015, 9 pages.

Krizhevsky, Alex, "Learning multiple layers of features from tiny images", In Technical report of University of Toronto, Apr. 8, 2009, pp. 1-58.

Kulkarni, et al., "Pruning of random forest classifiers: A survey and future directions", In Proceedings of International Conference on Data Science & Engineering, Jul. 18, 2012, pp. 64-68.

Kusner, et al., "Feature-cost sensitive learning with submodular trees of classifiers", In Proceedings of the Twenty-Eighth AAAI Conference on Artificial Intelligence, Jul. 27, 2014, pp. 1939-1945.

Kusner, et al., "Stochastic neighbor compression", In Proceedings of the 31st International Conference on Machine, Jun. 21, 2014, 9 pages.

Lecun, et al., "Gradient-based learning applied to document recognition", In Proceedings of the IEEE, vol. 86, Issue 11, Nov. 1998, pp. 1-46.

Li, Stan Z., "Markov Random Field Modeling in Image Analysis", In Publication of Springer London, Jan. 2001, 41 pages.

Li, et al., "Fast and accurate refined Nystrom based kernel SVM", In Proceedings of the Thirtieth AAAI Conference on Artificial Intelligence, Feb. 12, 2016, pp. 1830-1836.

Meunier, et al., "The Internet of things is now connecting the real economy", In Technical report, Morgan Stanley, Apr. 3, 2014, 96 pages.

Murthy, et al., "A system for induction of oblique decision trees", In Journal of Artificial Intelligence Research,, Aug. 1994, pp. 1-32.

Nan, et al., "Feature-budgeted random forest", In Proceedings of the 32nd International Conference on Machine, Jul. 6, 2015, 9 pages.

Nan, et al., "Pruning random forests for prediction on a budget", In Proceedings of Annual Conference on Neural Information Processing Systems, Dec. 5, 2016, 15 pages.

Norouzi, et al., "Efficient non-greedy optimization of decision trees", In Proceedings of Annual Conference on Neural Information Processing Systems, Dec. 7, 2015, pp. 1-10.

Pohlen, Tobias, "LibJungle—Decision Jungle Library.", https://bitbucket.org/geekStack/libjungle, Retrieved on: Mar. 17, 2017, 6 pages.

Rastegari, et al.; "XNOR-Net: ImageNet Classification Using Binary Convolutional Neural Networks", In Proceedings of 14th European Conference on Computer Vision, Oct. 11, 2016, pp. 1-17.

Rokach, et al., "Data mining with decision trees: theory and applications.", In Publication of World Scientific, Dec. 20, 2014, 4 pages.

Le, et al., "Fastfood—Approximating Kernel Expansions in Loglinear Time", In Proceedings of the 30th International Conference on Machine Learning, Jun. 16, 2013, 9 pages.

(56) References Cited

OTHER PUBLICATIONS

Shankar, et al., "Refining architectures of deep convolutional neural networks", In Proceedings of IEEE Conference on Computer Vision and Pattern Recognition, Jun. 27, 2016, pp. 1-9.

Sherali, et al., "An optimal constrained pruning strategy for decision trees", In INFORMS Journal on Computing, vol. 21, No. 1, Feb. 21, 2009, pp. 49-61.

Shotton, et al., "Decision jungles: Compact and rich models for classification", In Proceedings of Advances in neural information processing systems, Jan. 1, 2013, pp. 1-8.

Utgoff, Paul E., "Perceptron trees: A case study in hybrid concept representations", In Journal of Connection Science, vol. 1, Issue 4, Jan. 1989, pp. 377-391.

Varma, et al., "A statistical approach to texture classification from single images", In International Journal of Computer Vision, vol. 62, Issue 1-2, Nov. 2004, pp. 61-81.

Viola, et al., "Robust real-time face detection", In International Journal of Computer Vision, vol. 57, Issue 2, May 2004, pp. 137-154.

Wang, et al., "Efficient learning by directed acyclic graph for resource constrained prediction", In Proceedings of Advances in Neural Information Processing Systems, Dec. 7, 2015, pp. 1-9.

Wang, et al., "Deep distance metric learning with data summarization", In Proceedings of Machine Learning and Knowledge Discovery in Databases, Sep. 2016, pp. 1-16.

Wu, et al., "Quantized convolutional neural networks for mobile devices", In In Proceedings of the IEEE Conference on Computer Vision and Pattern Recognition, Jun. 2016, pp. 1-11.

Xu, et al., "The greedy miser: Learning under test-time budgets", In Proceedings of the 29th International Conference on Machine Learning, Jun. 26, 2012, 8 pages.

Xu, et al., "Cost-sensitive tree of classifiers", In Proceedings of the 30th International Conference on Machine Learning, vol. 1, Jun. 2013, 9 pages.

Yang, et al., "Group-sensitive multiple kernel learning for object categorization", In Proceedings of IEEE 12th International Conference on Computer Vision, Sep. 29, 2009, pp. 436-443.

Yang, et al., "Deep fried convnets", In Proceedings of IEEE International Conference on Computer Vision, Dec. 7, 2015, pp. 1476-1483.

Yang, et al., "Decision tree pruning via integer programming", In Working paper of Department of Management Sciences, University of Iowa, Jan. 2005, pp. 1-15.

Kumar, Ashish, et al., "Resource-Efficient Machine Learning in 2 KB RAM for the Internet of Things", In Proceedings of the 34th International Conference on Machine Learning, Jul. 17, 2017, pp. 1935-1944.

"International Search Report and Written Opinion Issued in PCT Application No. PCT/US2018/024980", dated Jul. 12, 2018, 13 Pages.

Qiu, Robert C., et al., "Machine Learning", In Book Cognitive Radio Communications and Networking, Oct. 5, 2012, pp. 283-321.

\* cited by examiner

RESOURCE-EFFICIENT MACHINE LEARNING

RELATED APPLICATIONS

This application claims priority to India provisional patent application 201741010547 titled "RESOURCE-EFFICIENT MACHINE-LEARNING" filed on Mar. 24, 2017, the entire content of which is incorporated by reference herein in its entirety.

BACKGROUND

A vast number of applications have been developed for consumer, enterprise and societal and interconnected devices. Such applications include predictive maintenance, connected vehicles, intelligent healthcare, fitness wearables, smart cities, smart housing, smart metering, etc. The dominant paradigm for these applications, given the severe resource-constrained devices, has been just to sense the environment and to transmit the sensor readings to the cloud where all the decision making happens.

SUMMARY

This summary section is provided to introduce aspects of embodiments in a simplified form, with further explanation of the embodiments following in the detailed description. This summary section is not intended to identify essential or required features of the claimed subject matter, and the combination and order of elements listed this summary section is not intended to provide limitation to the elements of the claimed subject matter.

A method of making a prediction using a device can include projecting, using a processor of a device, an input feature vector of a first dimensional space into a second dimensional space, using a projection matrix stored on a memory of the device, to create a lower dimensional feature vector, the second dimensional space smaller than the first dimensional space, determining a first prediction vector for an internal node of the tree, including multiplying a first predictor matrix, of the internal node, transposed and the projection matrix and multiplying a second predictor matrix, of the internal node, transposed and the projection matrix, determining whether to pass the first prediction vector to a first child or a second child of the internal node based on a sparse vector and the lower dimensional feature vector, determining a second prediction vector at a leaf node of the tree, including multiplying a first predictor matrix, of the leaf node, transposed and the projection matrix and multiplying a second predictor matrix, of the leaf node, transposed and the projection matrix, and determining an overall prediction by combining the first and second prediction vectors.

A non-transitory machine-readable medium including instructions for execution by a processor of the machine to perform operations including projecting an input feature vector of a first dimensional space into a second dimensional space, using a projection matrix, to create a lower dimensional feature vector, the second dimensional space smaller than the first dimensional space, determining a first prediction vector for an internal node of the tree, including multiplying a first predictor matrix, of the internal node, transposed and the projection matrix and multiplying a second predictor matrix, of the internal node, transposed and the projection matrix, determining whether to pass the first prediction vector to a first child or a second child of the internal node based on a sparse vector and the lower dimensional feature vector, determining a second prediction vector at a leaf node of the tree, including multiplying a first predictor matrix, of the leaf node, transposed and the projection matrix and multiplying a second predictor matrix, of the leaf node, transposed and the projection matrix, and determining an overall prediction by combining the first and second prediction vectors.

A device includes a processor and a memory device coupled to the processor and having a program stored thereon for execution by the processor to perform operations. The operations include projecting, an input feature vector of a first dimensional space into a second dimensional space, using a projection matrix, to create a lower dimensional feature vector, the second dimensional space smaller than the first dimensional space, determining a first prediction vector for an internal node of the tree, including multiplying a first predictor matrix, of the internal node, transposed and the projection matrix and multiplying a second predictor matrix, of the internal node, transposed and the projection matrix, determining whether to pass the first prediction vector to a first child or a second child of the internal node based on a sparse vector and the lower dimensional feature vector, determining a second prediction vector at a leaf node of the tree, including multiplying a first predictor matrix, of the leaf node, transposed and the projection matrix and multiplying a second predictor matrix, of the leaf node, transposed and the projection matrix, and determining an overall prediction by combining the first and second prediction vectors.

DETAILED DESCRIPTION

Figure 1:
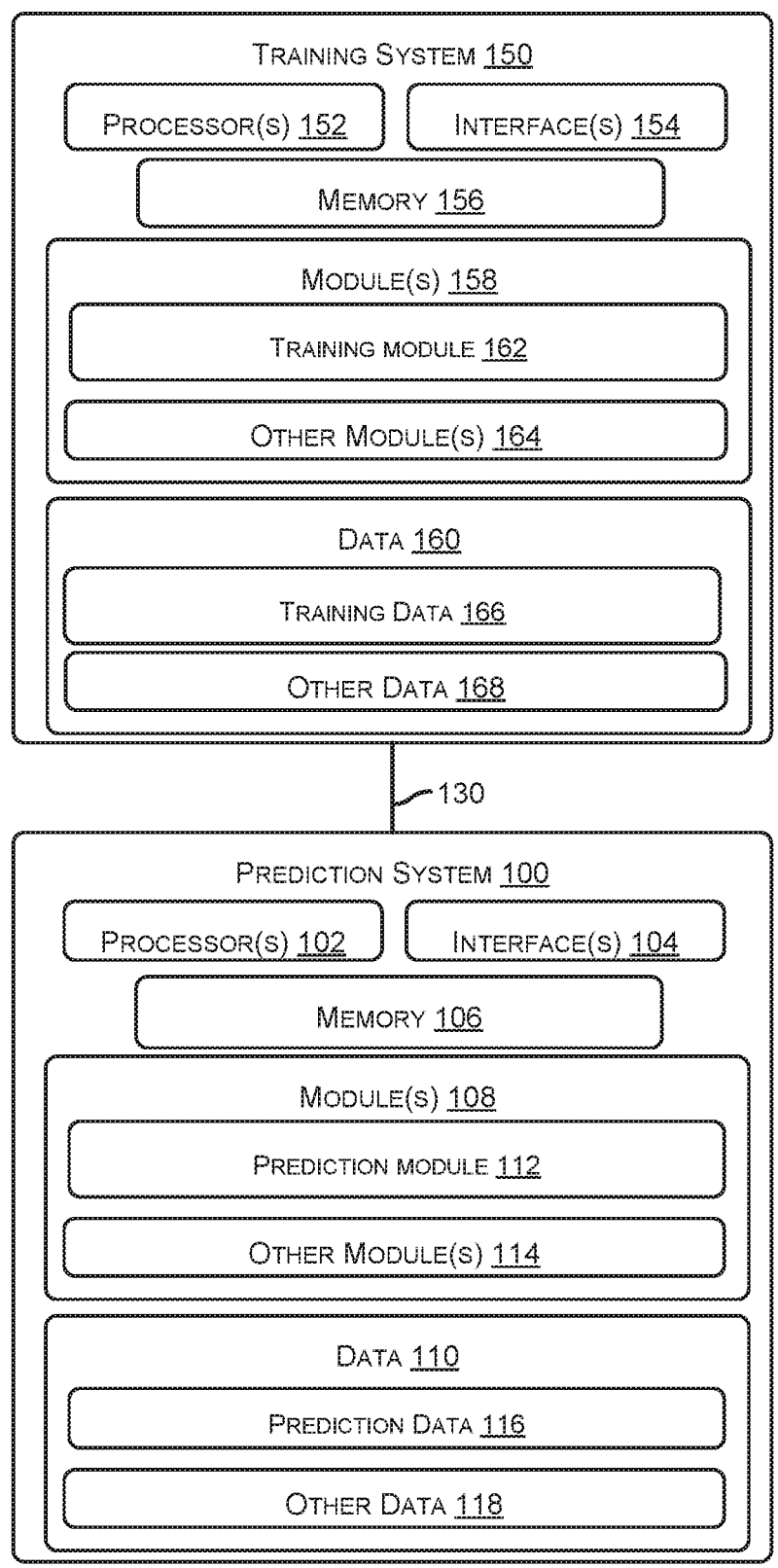
FIG. 1 illustrates, by way of example, a block diagram of an embodiment of a prediction system.

In the following description, reference is made to the accompanying drawings that form a part hereof, and in which is shown by way of illustration specific embodiments which may be practiced. These embodiments are described in sufficient detail to enable those skilled in the art to practice the embodiments. It is to be understood that other embodiments may be utilized and that structural, logical, and/or electrical changes may be made without departing from the scope of the embodiments. The following description of embodiments is, therefore, not to be taken in a limited sense, and the scope of the embodiments is defined by the appended claims.

The operations, functions, or algorithms described herein may be implemented in software in some embodiments. The software may include computer executable instructions stored on computer or other machine readable media or storage device, such as one or more non-transitory memories or other type of hardware based storage devices, either local or networked. Further, such functions may correspond to subsystems, which may be software, hardware, firmware or a combination thereof. Multiple functions may be performed in one or more subsystems as desired, and the embodiments described are merely examples. The software may be executed on a digital signal processor, ASIC, microprocessor, central processing unit (CPU), graphics processing unit (GPU), field programmable gate array (FPGA), or other type of processor operating on a computer system, such as a personal computer, server or other computer system, turning such computer system into a specifically programmed machine. The functions or algorithms may be implemented using module(s) (e.g., processing circuitry, such as may include electric and/or electronic components (e.g., one or more transistors, resistors, capacitors, inductors, amplifiers, modulators, demodulators, antennas, radios, regulators, diodes, oscillators, multiplexers, logic gates, buffers, caches, memories, or the like)).

Discussed herein are embodiments that may include making a prediction. The embodiments may include using lower power, less memory, and/or less time than other prediction techniques. Several approaches have attempted to perform predictions locally on devices. In one example, the device could be an Internet of Things (IoT) device. In some embodiments, the approach using the local prediction may be implemented for several scenarios including, but not limited to, the IoT devices, Machine Learning (ML) predictors that run in Level 1 (L1) cache of modern day computing devices, and low latency predictors such as those in astrophysics that designed to handle high data rates. Other examples in which the approach may be used include running low-latency ML techniques on a computing device (e.g., one or more mobile devices, laptops desktops, and servers, or the like), running ML techniques that can fit in the cache of a computing device, ML techniques analysing data (e.g., real time data) gathered from high-throughput devices, such as radio telescopes, video networks, biology applications, or the like, and ML technique running on cloud servers and handling large amounts of data. The prediction may be used by the device to perform an action.

The above-mentioned implementations are further described herein regarding the accompanying figures. It should be noted that the description and figures relate to exemplary implementations, and should not be construed as a limitation onto the present disclosure. It is also to be understood that various arrangements may be devised that, although not explicitly described or shown herein, embody the principles of the present disclosure. Moreover, all statements herein reciting principles, aspects, and embodiments of the systems and methods disclosed herein, as well as specific examples, are intended to encompass equivalents thereof.

FIG. 1 illustrates, by way of example, a diagram of an embodiment of a prediction system 100 and a training system 150. In one or more embodiments, the prediction system 100 and the training system 150 may be implemented as discrete computing-devices. The computing devices may be configured for carrying out a computer implemented method for performing predictions or training. The prediction may be performed locally, such as on a resource-constrained or another device. In one or more embodiments, the resource-constrained device may include an Internet of Things (IoT) device. The IoT is an internetworking of IoT devices that include electronics, software, sensors, actuators, and network connectivity that allow the IoT devices to collect and/or exchange data. Note that embodiments discussed herein are applicable to more applications than just IoT devices. Any application/device that may benefit from quick, low power, low resource, or the like prediction capability, may benefit from one or more embodiments discussed herein.

The prediction system 100 may be implemented as a stand-alone computing device. Examples of such computing devices include laptops, desktops, tablets, hand-held computing devices such as smart-phones, or any other forms of computing devices. Continuing with the present implementation, the prediction system 100 may further include one or more processor(s) 102, interface(s) 104, and memory 106. The processor(s) 102 may also be implemented as signal processor(s), state machine(s), circuitry (e.g., processing or logic circuitry), and/or any other device or component that manipulate signals (e.g., perform operations on the signals, such as data) based on operational instructions.

The interface(s) 104 may include a variety of interfaces, for example, interfaces for data input and output devices, referred to as I/O devices, storage devices, network devices, and the like, for communicatively associating the prediction system 100 with one or more other peripheral devices. The peripheral devices may be input or output devices communicatively coupled with the prediction system 100, such as other IoT or other devices. The interface(s) 104 may also be used for facilitating communication between the prediction system 100 and various other computing devices connected in a network environment. The memory 106 may store one or more computer-readable instructions, which may be fetched and executed for carrying out a process for making a prediction or making a decision. The memory 106 may include any non-transitory computer-readable medium including, for example, volatile memory, such as RAM, or non-volatile memory such as EPROM, flash memory, and the like.

The prediction system 100 may further include module(s) 108 and data 110. The module(s) 108 may be implemented as a combination of hardware and programming (e.g., programmable instructions) to implement one or more functionalities of the module(s) 108. In one example, the module(s) 108 includes a prediction module 112 and other module(s) 114. The data 110 on the other hand includes prediction data 116, and other data 118.

In examples described herein, such combinations of hardware and programming may be implemented in several different ways. For example, the programming for the module(s) 108 may be processor executable instructions stored on a non-transitory machine-readable storage medium and the hardware for the module(s) 108 may include a processing resource (e.g., one or more processors or processing circuitry), to execute such instructions. In some of the present examples, the machine-readable storage medium may store instructions that, when executed by the processing resource, implement module(s) 108 or their associated functionalities. In such examples, the prediction system 100 may include the machine-readable storage medium storing the instructions and the processing resource to execute the instructions, or the machine-readable storage medium may be separate but accessible to prediction system 100 and the processing resource. In other examples, module(s) 108 may be implemented by electronic circuitry.

In operation, the prediction module 112, is to implement one or more shallow, sparse trees, such as with non-linear predictors at each node. One objective is to minimize model size, prediction time and prediction energy, while maintaining prediction accuracy, even at the expense of increased training costs (e.g., compute cycles, power consumption, time, or the like). The prediction module 112 may be trained on a laptop and then burnt, along with the prediction code, onto the memory 106 (e.g., the flash memory) of the system 100. After deployment, the memory 106 may be read-only, and all features, variables and intermediate computations may be stored in the memory 106.

The systems and methods of the present disclosure may be adapted to many other settings and architectures. In the following description, various functions, processes and steps, in one implementation, may be performed by the prediction module 112 or a separate device, such as in the case of training the tree and corresponding parameters. It should be noted that any other module, when suitably programmed, may also perform such functions without deviating from the scope of the present disclosure. The advantages of the present disclosure are provided regarding embodiments as described below. It should also be understood that such implementations are not limiting. Other implementations based on similar approaches would also be within the scope of the present disclosure.

The training system 150 includes components like the prediction system 100, such as the processors 152, interfaces 154, memory 156, other module(s) 164, and other data 168. The modules 158 may be like the modules 108 with the modules 158 including the training module 162. The data 160 may be like the data 110, with the data 160 including the training data 166.

The training system 150 determines the tree and corresponding tree parameters. The tree parameters may include (a) a sparse vector for each internal node that may be used to determine which child to pass a determined vector, (b) a projection matrix that may be used to reduce an input feature vector to a lower dimensional space, facilitate passing the vector, or making a prediction, (c) a first predictor matrix for each internal and leaf node, and/or (d) a second predictor matrix for each internal and leaf node of the tree. The training of the tree parameters may be accomplished jointly, such as by training all tree parameters together. The training module 162 may use the training data 166 to determine the tree parameters. The training data 166 may include input-output examples, which indicate a desired output for a given input. Such training may include using gradient descent and/or iterative hard thresholding operations. Such a training allocates a specific amount of memory to operations performed by each node of the tree, thus allowing the model to be constrained to a specific memory space.

The training system 150 provides the tree and corresponding tree parameters to the prediction system 100, such as on connection 130. The connection 130 may include a wired or wireless connection. The wired or wireless connection may provide a direct connection (a connection with no other device coupled between the training system 150 and the prediction system 100) or an indirect connection (a connection with one or more devices coupled between the training system 150 and the prediction system 100).

Figure 2:
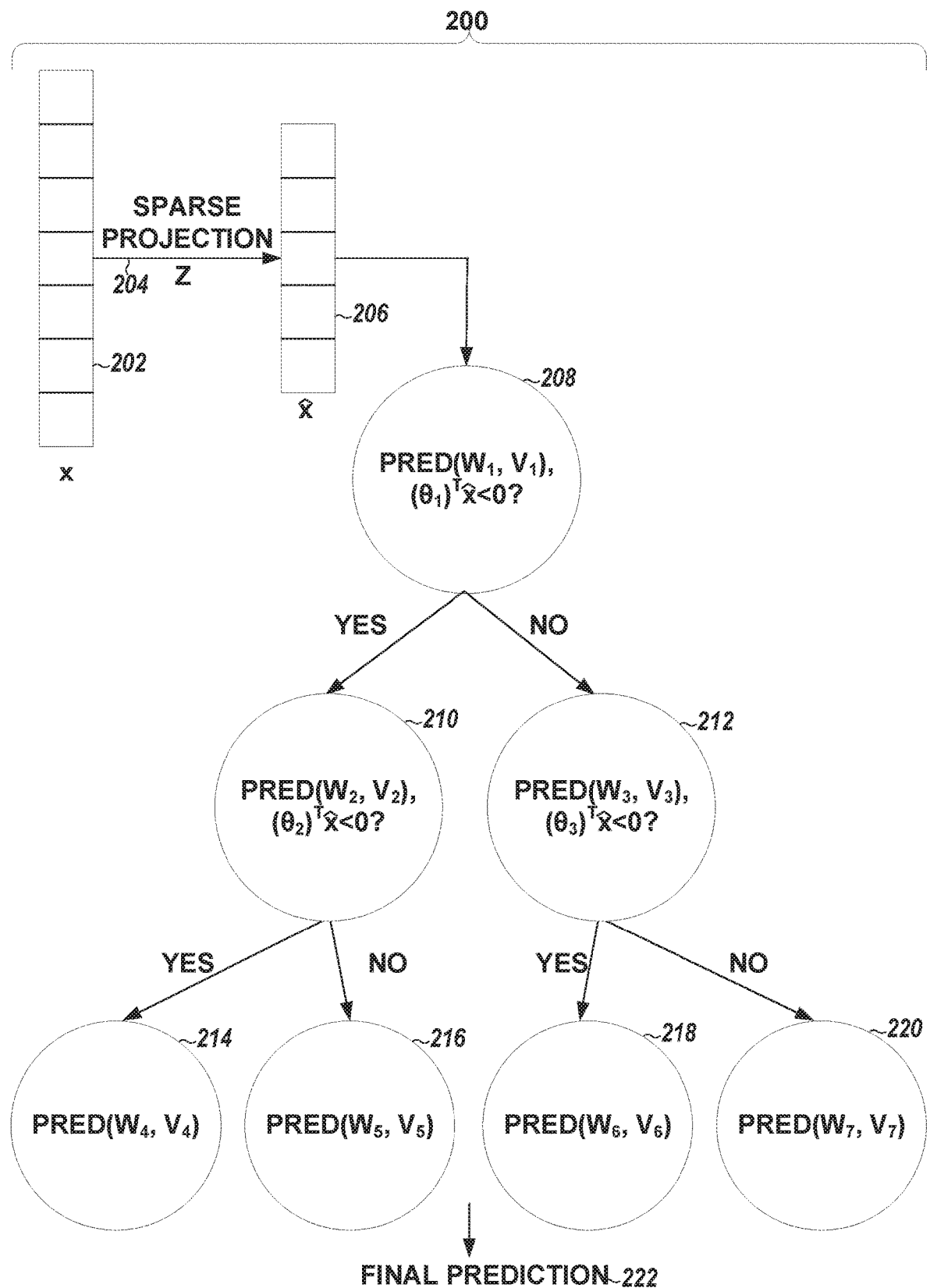
FIG. 2 illustrates, by way of example, a diagram of an embodiment of a method for prediction or decision making.

FIG. 2 illustrates, by way of example, a flow diagram of an embodiment of a prediction or decision method 200. The method 200 begins by training a sparse projection matrix, a branching function, $\theta_k$, for each internal node, and prediction functions $W_n$ and $V_n$, for every node of the tree. Training is discussed elsewhere herein. The method 200 includes receiving a feature vector 202 and projecting the feature vector 202 to a lower-dimensional space, such as by multiplying by the sparse projection matrix 204, to create a lower-dimensional feature vector 206. The method 200 further includes, at each internal node 208, 210, and/or 212 on a prediction path, determining a prediction based on the prediction functions and determining which direction to branch based on the branching function. In the embodiment illustrated, if $\theta_k^T \hat{x} < 0$, then the prediction branches left, and the prediction branches right otherwise. The method 200 further includes, at each leaf node 214, 216, 218, and 220 on the prediction path based on the prediction functions. The method 200 includes determining a final prediction 222. The final prediction 222 may include a sum of all the predictions along the prediction path. For example, if the prediction path includes nodes 208, 210, and 214, the final prediction 222 may include tan $h(V_1^T \hat{x}) W_1^T \hat{w}$+tan $h(V_2^T \hat{x}) W_2^T \hat{x}$+tan $h(V_4^T \hat{x}) W_4^T \hat{x}$.

More details regarding the training and prediction methods, such as may be performed by the training system 150 and prediction system 100 (or some components thereof), respectively, are now presented.

The present disclosure provides approaches using a tree-based computer implemented method and system for performing predictions locally, such as on a resource-constrained device. In one example, the resource-constrained device could be an IoT device. The tree-based computer-implemented method may be trained on a laptop or similar local computing device, or on a cloud computing system (such as the public cloud provided by Microsoft Azure or Amazon AWS), and may then be shipped onto resource-constrained devices as per an implementation of the systems and methods of the present disclosure. In one example, the presently described tree-based computer implemented method and system may be implemented for several scenarios including, but is not limited to, the IoT devices, machine learning (ML) predictors to be run in an L1 cache of a computing device, and low latency predictors such as those in astrophysics, etc. that include data coming in at a relatively high rate.

In one example, the resource-constrained device may be an Arduino Uno board, which comprises an 8-bit ATmega328P microcontroller operating at 16 MHz with 2 KB SRAM and 32 KB read-only flash memory. In another example, the resource-constrained device may be BBC Micro:Bit, which has a 32 bit ARM Cortex M0 microcontroller operating at 16 MHz with 16 KB static random access memory (SRAM) and 256 KB read-only flash. Neither of these example devices provide native support for floating point operations. Many other resource-constrained devices exist, these two are merely just examples of resource-constrained devices.

A variety of such resource-constrained devices have been deployed. Before a typical deployment, the operating system and all application code and data are burnt onto flash, leaving only a few KB for storing the trained ML model, prediction code, feature extraction code, and associated data and parameters within memory of the resource-constrained device. In some cases, after deployment, the only writeable memory available is the 2 KB (Uno) or 16 KB (Micro:Bit) of SRAM which might not be sufficient to hold even a single feature vector for prediction by such devices.

In resource-efficient ML, specialized solutions have been developed for reducing the prediction costs of k-nearest neighbor (kNN) computer implemented methods, model compression, feature selection, and applications such as face detection. Resource-efficient tree classifiers are particularly relevant to subject under consideration. The standard approach is to grow the decision tree ensemble on a node by node basis until the prediction budget is exhausted. Another example is to first learn the random forest or gradient boosted decision tree ensemble to maximize prediction accuracy and then use pruning techniques to meet the budget constraints. However, such techniques are fundamentally limited as they attempt to approximate complex non-linear decision boundaries using a small number of axis-aligned hyperplanes. This may lead to poor prediction accuracies.

Further, tree models have also been developed to learn more complex decision boundaries. Such models move away from learning axis-aligned hyperplanes at internal nodes and constant predictors at the leaves. For instance, learning more powerful branching functions at internal nodes based on oblique cuts and full hyperplanes or learning more powerful leaf node predictors based on linear classifiers, kernelized SVMs, etc.

Generally, tree based mechanisms may be used for classification, regression, ranking and other problems commonly found in an environment of interconnected resource-constrained devices. Even more importantly, may be suited to such applications as they may achieve good prediction accuracies with prediction times and energies that are logarithmic in the number of training points. However, tree based mechanisms do not directly fit on tiny resource-constrained devices as their space complexity is linear rather than logarithmic. Learning shallow trees, or aggressively pruning deep trees or large ensembles, to fit in just a few KB often leads to poor prediction accuracy.

Systems and methods for resource efficient ML in devices are described. In an example, resource efficient ML is accomplished through a tree learner mechanism. For implementing machine learning, the tree learner mechanism (e.g., the training system) learn one or more shallow, sparse tree, to reduce model size but with powerful nodes for accurate prediction. Powerful nodes are those that make predictions (e.g., by determining a prediction vector). A shallow tree includes five or fewer levels, such as may include two, three, four, or five levels. A As would be evident from the description presented in the following paragraphs, both internal and leaf nodes are relied on for performing non-linear predictions. In one example, the overall prediction for a point may be considered as a sum of the individual node predictions along the path traversed by the point. A sparse tree includes operations performed using one or more sparse matrices at each node, such as to use only sparse matrices (e.g., besides the input feature matrix or prediction matrix) in performing operations, such as to make a prediction. A sparse matrix includes a majority of entries that are zero.

Returning to the prediction mechanism, path based prediction allows computing devices to accurately learn non-linear decision boundaries while sharing parameters along paths to further reduce model size. Thereafter, a sparse matrix may be learned wherein the sparse matrix projects all data points into a low-dimensional space in which the tree is learnt. These aspects allow the machine learning mechanism to be deployed in devices having less available memory. Furthermore, the sparse projection is implemented in a streaming fashion thereby allowing applications to be implemented where even a single feature vector might not fit in 2 KB of random access memory (RAM). Furthermore, rather than teaming the tree nodes of the systems and methods disclosed herein on a node-by-node greedy fashion, all nodes are learnt jointly, along with the sparse projection matrix, first and second predictor matrices, and a sparse vector, to more efficiently allocate memory budgets to each node while maximizing prediction accuracy. The systems and methods of the present disclosure reduce prediction costs on the devices which in some cases have been observed to be even lower than that of an unoptimized linear classifier, thereby providing prediction accuracy of a non-linear classifier while paying less than linear costs in terms of power, time, resource consumption, or the like.

In some examples, the systems and methods of the present disclosure has been observed to make predictions in milliseconds even on slow microcontrollers, fit in a few KB of flash, and/or extend battery life beyond all other current computer implemented methods. Furthermore, on multiple benchmark datasets, prediction accuracies resulting from the systems and methods disclosed herein may approach those of uncompressed kNN classifiers, radial basis function support vector machines (RBFSVMs), single hidden layer neural networks, and gradient boosted decision tree ensembles whose models might take many megabytes (MB) of Random Access Memory (RAM). In one example, prediction accuracies for a given model size may be as much as 30% higher than state-of-the-art methods for resource efficient ML. The systems and methods disclosed herein may be extended to other environments involving resource-constrained or even non-resource-constrained devices, without deviating from the scope of the systems and methods of the present disclosure. For example, using a 300-byte model, the tree based computer implemented methods and systems of the present disclosure may produce better search results as compared to the L3 ranker of a current search engine. Further, the tree based computer methods and systems of present disclosure may achieve better budget utilization than the conventional models by learning shorter trees, typically depth 4 or lower, and by, sharing the parameters between leaf node predictors.

What follows is a description of prediction techniques. The prediction techniques may be implemented using one or more components of the prediction system 100.

In an example, the systems and methods of present disclosure learns its tree in a low dimensional space, learning sparse branching functions and predictors and generalizing the model to multi-class classification, ranking, etc. Further, the computer implemented system and method as disclosed herein may have lower model size and higher accuracy as it learns a single, shallow tree in a low-dimensional space with non-linear predictors.

In an implementation of the systems and methods disclosed herein, the prediction module 112 projects each D-dimensional input feature vector x into a lower $\hat{D}$-dimensional space using a learnt sparse projection matrix $Z_{\hat{D} \times D}$. Further, the systems and methods disclosed herein may use fixed point arithmetic for all math computation, including Zx, when implemented on the resource-constrained device, such as to avoid floating point overheads. $\hat{D}$ may be 5 or lower, such as for many binary classification applications.

The model size is comparatively reduced as all tree parameters are now learnt in the low-dimensional space. Further, when $\hat{D}$ is small, Zx may be stored directly in the memory 106 (e.g., an addressable register of the memory 106) thereby reducing prediction time and energy. Another advantage of the systems and methods disclosed in the present disclosure is that learning the projection matrix jointly with the tree parameters may help improve prediction accuracy. Furthermore, since Zx may be computed in a streaming fashion, the systems and methods disclosed herein may tackle IoT applications where even a single feature vector may not fit in 2 KB of SRAM. This may be beneficial, since standard tree implementations are unable to handle a streaming feature vector—the entire feature vector needs to be streamed for the root node to determine whether to pass the point down to the left or right child and therefore the vector is unavailable for processing at other nodes. Some implementations work around this limitation by simultaneously evaluating the branching function at all nodes as the vector θ is streamed but this destroys the log time prediction property of trees which may provide an unacceptably high prediction time.

In an implementation of the systems and methods of the present disclosure, the tree based mechanism learns a sparse vector θ at each internal node such that the sign of $θ^T Zx$ determines whether point x should be passed to the node's left or right child. The tree based computer implemented methods and systems disclosed herein are capable to learn shallow trees which may fit in a few KB of memory due to usage of more powerful branching functions than the axis-aligned hyperplanes in standard decision trees.

In an implementation of the system and methods of the present disclosure, for a multi-class, multi-label or regression problem with L targets, the tree based mechanism may enable learning of matrices $W_{\hat{D} \times L}$ and $V_{\hat{D} \times L}$ at both leaf and internal nodes so that each node predicts the vector $W^T Zx° \tan h(σV^T Zx)$ where ° denotes the elementwise Hadamard product and σ is a user tunable hyper-parameter. The functional form of the node predictor was chosen as it was found to work well empirically (other forms could be chosen if found to be more appropriate). Further W and V reduce to vectors for binary classification, ranking and single-target regression. Overall predicted vector is the sum of the individual vectors predicted by the nodes lying along the path traversed by x.

$$y(x) = \sum_k I_k(x) W_k Zx° \tanh(σ V_K^T Zx) \quad (1)$$

where $I_k(x)$ is an indicator function taking the value "1" if node k lies along the path traversed by x and 0 otherwise. This may allow accurate learning of non-linear decision boundaries using shallow trees with just a few nodes. Furthermore, path-based prediction allow parameter sharing and therefore reduce model size as compared to putting independent classifiers of at least equal complexity in the leaf nodes alone. In an example, the tree based computer implemented methods and systems disclosed herein with a depth 4 tree with 15 internal and 16 leaf nodes stores 31 W and 31 V matrices with overall predictions being the sum of 4 terms depending on the path taken. If parameters were not shared and each leaf node independently learnt 4 W and 4 V matrices to make predictions of at least equal complexity, then a total of 16*4=64 W and 64 V matrices would need to be stored thereby exceeding the memory budget.

Computing tangent (tan h( )) may be expensive without hardware support, but the systems and methods disclosed herein may use an approximation tan h(x)=x if |x|<1 and sign um(x) otherwise.

What follows is a description of training technique(s). Such operations may be performed by one or more components of the training system 150, such as may be included in the method 200 and/or 300.

The tree based computer implemented methods and systems disclosed herein learn a balanced tree of user specified height h with $2^h-1$ internal nodes and $2^h$ leaf nodes. The parameters that need to be learnt include: (a) Z: the sparse projection matrix; (b) $σ_k$: the parameters of the branching function at each internal node; and (c) $W_k$ and $V_k$: the predictor parameters at each node.

Let $Θ=[(θ_k)_{k=1}^{2^h-1} (W_k)_{k=1}^{2^{(h+1)}-1} (V_k)_{k=1}^{2^{(h+1)}-1}]$ denote a matrix obtained by stacking all the parameters together (except for Z). Also, let $Λ=diag((λ_θ)_1^{2^h-1}, (λ_W)_1^{2^{(h+1)}-1}, (λ_V)_1^{2^{(h+1)}-1})$ be a diagonal matrix with only three unique non-zero entries representing the user-tunable regularization coefficients for θ, W and V. Finally, it is assumed that N training points $\{(x_i, y_{-1})_{i=1}^N\}$ have been provided and that budget constraints $B_Z$ and $B_Θ$ on the projection matrix and tree parameters have been specified depending on the flash memory available.

The parameters referred above may be learnt as:

$$\min_{Z,Θ} J(Z, Θ) = 1/2 Tr(ΛΘ^T Θ) + \frac{λ_Z}{2 Tr(ZZ^T)} + \quad (2)$$

$$1/N \sum_{i=1}^N L(x_i, y_i, y(x_i); Z, Θ) \text{ Such That } \|Z\|_0 \leq B_Z, \|Θ\|_0 \leq B_Θ$$

where $y(x_i)$ is a prediction for feature vector $x_i$ as given in (1) and ∠ is an appropriately chosen loss function for classification, regression, ranking, etc. For instance, ∠=max $(0, 1-y_i y(x_i))$ with $y_i \in \{-1, +1\}$ for binary classification and $L=\max_{y \in Y}((y_i-y)^T y(x_i)+1-y_i^T y)$ with $Y=\{y|y \in \{0; 1\}^L, 1^T y=1\}$ and $y_i \in Y$ for multi-class classification. The optimization problem is formulated such that all parameters are learnt jointly subject to the budget constraints. This may lead to higher prediction accuracies than if Z were first learnt independently, say using sparse PCA, and then Θ was learnt afterwards.

Further, optimizing equation (2) over the space of all balanced trees of height h is a hard, non-convex problem. Tree growing computer implemented methods and systems as disclosed herein may help optimize such problems by growing the tree a node at a time starting from the root. However, this leads to a suboptimal utilization of the memory budget, as it is not clear a priori how much budget to allocate to each node. For instance, it is not apparent whether the budget should be distributed equally between all nodes or whether the root node should be allocated more budget and, if so, by how much.

Returning to the systems and methods of the present disclosure, the tree based mechanism learns all node parameters jointly with the memory budget for each node being determined (automatically—without human interference after deployment) as part of the optimization. The difficulty with joint learning is that a node's ancestors may need to be learnt before it may be determined which training points will reach the node. Furthermore, the path traversed by a training point is a sharply discontinuous function of θ and Z thereby rendering gradient based techniques ineffective. The systems and methods disclosed herein may ease the objective function by initially allowing points to traverse multiple paths in the tree. In particular, the indicator function $I_k(x)$ is relaxed to $I_k > i(x) = ½ I_j(x)(1-(-1)^{k-2j} \tan h(σ_1 θ_j^T Zx)$ where j=[k/2] is k's parent node in a balanced tree, $I_1(x)=1$ and the parameter $σ_1$ controls the fidelity of the approximation. Gradients may now be computed as $$\nabla_{θ_l} I_k(x) = σ_1 I_k(x) P_k^l(x) Zx \quad (3)$$

$$\nabla_Z I_k(x) = Σ_l σ_1 I_k(x) P_k^l(x)_1 θ_l x^T \quad (4)$$

Where $P_k^l(x) = δ_k^l ((-1)^{C_k(l)} - \tan h(σ_1 θ_l^T Zx))$, $δ_k^l = 1$, if node l is an ancestor of node k and 0 otherwise and $C_k(l)=1$ if node k is in the right subtree of node l and 0 otherwise. Allowing a point to traverse multiple paths increases prediction costs. Some approaches therefore allow multiple paths during training but select a single path during prediction. In some embodiments, at each node, a point x is greedily branched to the child node having the greatest $I_k(x)$. However, this may lead to a reduced accuracy as the model learned during training is different from the one used for prediction.

To this end, the systems and methods of the present disclosure may follow an alternative strategy where $\sigma_1$ is tuned during training to ensure that points gradually start traversing at most a single path as optimization progresses. In particular, $\sigma_1$ is initialized to a small value, such as 0.01, to ensure that tan h values are not saturated. As optimization progresses, $\sigma_1$ is gradually increased so that tan h tends to the signum function and $I_k(x)$ goes back to being an indicator function by the time convergence is reached. This allows some systems and methods disclosed herein to directly use the learnt model for prediction and was found to empirically lead to good results.

Various gradient based approaches, including those based on alternating minimization, have been tried for optimizing equation (2). A gradient descent based computer implemented method and system with iterative hard thresholding (IHT) was empirically found to yield the best solutions. Gradient descent was chosen over stochastic gradient descent as it removed the burden of step size tuning, led to slightly better prediction accuracies while keeping training time acceptable. For instance, training times range from 2 minutes for USPS-2 to 15 minutes for MNIST-2 on a single core of a laptop with an Intel Core.

In an example, a prediction may include determining a task being performed by an entity in an image captured by an imaging device. The task can be considered either intensive or non-intensive. Training data for such a task may include frequency domain features of time series data of entities performing tasks. The sparse projection matrix in such as prediction may include over one thousand non-zero entries (over 2 KB after compression).

In another example, the prediction may include determining whether a noise or sound originated from a specified entity, such as a human, whale, dog, or other animal. The training data in such an example may include audio recordings, wherein the origin of sounds on the recordings are known. The sparse projection matrix in such as prediction may include hundreds of non-zero entries.

In yet another example, the prediction may include determining characters and numbers from images. The training data in such an example may include pixel data from images that include known characters and/or numbers. In such an example, a sparse projection matrix may include thousands of non-zero entries (e.g., tens of bytes after compression).

Other predictions that can be made using embodiments discussed herein include facial recognition, a desired URL based on a search, email filtering, detection of malware, or other machine learning prediction. The size of the sparse projection matrix and the character of the training data may vary for each of the predictions.

TABLE 1

Dataset statistics - the number after the dataset name represents the number of classes, such as to distinguish between the binary and multi-class versions of the dataset.

| DATASET | #TRAIN | #TEST | #FEATURES |
|---|---|---|---|
| L3 RANKING | 704,841 | 123,268 | 50 |
| CHARS4K-2 | 4,397 | 1,886 | 400 |
| CIFAR10-2 | 50,000 | 10,000 | 400 |
| WARD-2 | 4,503 | 1,931 | 1,000 |
| USPS-2 | 7,291 | 2,007 | 256 |
| MNIST-2 | 60,000 | 10,000 | 784 |
| EYE-2 | 456 | 196 | 8,192 |
| RTWHALE-2 | 5,265 | 5,264 | 2,000 |
| CURET-61 | 4,204 | 1,403 | 610 |
| MNIST-10 | 60,000 | 10,000 | 784 |
| CHARS4K-62 | 4,397 | 1,886 | 400 |

Further, in an i7-3667U processor at 2 GI-12 with 8 GB of RAM, stochastic gradient descent could be utilized for larger datasets or if training costs also needed to be minimized. The computer implemented method and system as disclosed herein proceeds iteratively based on the following gradient and IHT steps in each iteration.

Gradient step: Given feasible $Z^t$ and $\Theta^t$ with a feasible allocation of the memory budget to various nodes at time step t, the systems and methods disclosed herein apply M updates of gradient descent keeping the support of Z and $\Theta$ fixed so that the budget allocations to nodes remain unchanged and the memory constraints are never violated. The update equations at each time step are:

$$Z^{t+1}=Z^t-\eta_Z{}^t\nabla_Z J(Z^t,\Theta^t)|_{supp(Z^t)} \quad (5)$$

$$\Theta^{t+1}=\Theta^t-\eta_\Theta{}^t\nabla_\Theta J(Z^t,\Theta^t)|_{supp(\Theta^t)} \quad (6)$$

With step sizes $\eta_Z$ and $\eta_\Theta$ being chosen per the Armijo rule and $I_{supp}$ indicating that the gradient was being computed only for the non-zero entries. M=5 and M=15 iterations were found to work well for binary and multi-class classification respectively. This allows the systems and methods disclosed herein to decrease the objective function value without changing the budget allocation of various nodes.

To improve the budget allocation, the tree based computer implemented methods and systems disclosed herein perform a single gradient update with unrestricted support. This violates the memory constraints and the systems and methods disclosed herein therefore project the solution onto the feasible set by retaining the parameters with the largest magnitudes $$Z^{t+M_1}=T_{B_Z}(Z^{t+M}-\eta_Z{}^{t+M}\nabla_Z J(Z^{t+M},\Theta^{t+M}))$$

$$\Theta^{t+M_1}=T_{B_\Theta}(\Theta^{t+M}-\eta_\Theta{}^{t+M}\nabla_\Theta J(Z^{t+M},\Theta^{t+M}))$$

where $T_k$ is an operator returning k of its arguments which have the largest magnitudes while setting the rest to 0. This allows the systems and methods of the present disclosure to move to another feasible solution with even lower objective function value by improving the memory budget distribution across nodes.

In general, projected gradient descent based computer implemented methods and systems might oscillate for non-convex problems. However, for smooth objective functions, gradient descent computer implemented methods and systems with Iterative Hard Thresholding (IHT) do indeed converge to a saddle point solution. Furthermore, if the objective function satisfies the Restricted Strong Convexity (RSC) property in a local region, then projected gradient descent with IHT will converge to the local minimum in that region. The systems and methods disclosed herein also satisfy the RSC property for random data drawn from a fixed distribution and an initial point that is close enough to the global optima. The systems and methods disclosed herein may provide a good quality solution in a few hundred iterations. The termination criteria used was that the projected gradient magnitude should be lower than a pre-specified threshold or a maximum number of iterations T=300 were reached.

In further implementation of systems and methods of the present disclosure, $Z^0$ and $\Theta^0$ could be set randomly. Prediction accuracy gains of up to 1.5% could be observed if the systems and methods disclosed herein was initialized by taking T steps of gradient descent without any budget constraints followed by a hard thresholding step. Further gains of 1.5% could be observed by taking another T steps of gradient descent with fixed support after termination. This helped in fine-tuning parameters of the systems and methods disclosed herein once the memory budget allocation had been finalized across the tree nodes.

ADDITIONAL EXAMPLES

Further, experiments were carried out on several publicly available binary and multi-class datasets including. Chars4K, CWAR10, MNIST, WARD, USPS, Eye, RTWhale (RTW), and CUReT. Binary versions of these datasets were also downloaded. Further, L3 Ranking is a proprietary dataset from a popular search engine where ground truth annotations specifying the relevance of query-document pairs have been provided on a scale of 0-4. Table 1 lists the statistics of these datasets.

Outcomes of systems and methods disclosed herein were compared to state of-the-art computer implemented methods for resource-efficient ML spanning tree, kNN, SVM and single hidden layer neural network computer implemented methods including Decision Jungles, Feature Budgeted Random Forests (BudgetRF), Gradient Boosted Decision Tree Ensemble Pruning (Tree Pruning), Local Deep Kernel Learning (LDKL), Neural Network Pruning (NeuralNet Pruning) and Stochastic Neighbor Compression (SNC). Publicly available implementations of all computer implemented methods were used taking care to ensure that published results could be reproduced thereby verifying the code and hyper-parameter settings.

Hyper-parameters: The publicly provided training set for each dataset was subdivided into 80% for training and 20% for validation. All hyper-parameters were tuned on the validation set. Once the hyper-parameters had been fixed, the tree based computer implemented methods and systems disclosed herein were trained on the full training set and results were reported on the publicly available test set.

Once the learnt model has been burnt onto flash, applications deployed on resource-constrained devices would like to minimize prediction time and energy while maximizing accuracy. Accuracies of all computer implemented methods and systems are therefore presented for a range of model sizes. Some of the prediction by computer implemented methods and systems were also implemented on the Arduino Uno and their prediction times and energies are compared to the systems and methods of the present disclosure.

Results are presented throughout for an unoptimized implementation of systems and methods disclosed herein for a fair comparison with the other methods. For instance, 4 bytes are used to store floating point numbers for all computer implemented methods and systems, all floating-point operations are simulated in software, etc. However, results are also presented for an optimized implementation of systems and methods disclosed herein, where numbers are stored in a 1 byte fixed point format, tank is approximated, all floating-point operations are avoided, etc.

In one example, the method as implemented onto a computing device was executed and various outcomes were tabulated (labelled as Bonsai) and compared to uncompressed methods, provided as Table 2.

TABLE 2

| | Binary Datasets | | | | | |
|---|---|---|---|---|---|---|
| | BONSAI(%) | | | | RBF- | NEURALNET |
| DATASET | 2 KB | 16 KB | GBDT(%) | kNN(%) | SVM(%) | (%) |
| RTWHALE-2 (DS1) | 61.74 | 61.74 | 59.40 (156 KB) | 51.84 (41133 KB) | 54.16 (36784 KB) | 52.26 (3910 KB) |
| CHARS4K-2 (DS2) | 74.28 | 76.67 | 73.49 (125 KB) | 69.61 (6870 KB) | 76.88 (5852 KB) | 73.49 (157 KB) |
| EYE-2 (DS3) | 88.26 | 90.31 | 84.18 (586 KB) | 76.02 (14592 KB) | 90.81 (10682 KB) | 91.84 (3201 KB) |
| WARD-2 (DS4) | 95.85 | 96.89 | 98.03 (94 KB) | 94.97 (17590 KB) | 96.32 (5764 KB) | 95.55 (391 KB) |
| CIFAR10-2 (DS5) | 73.02 | 76.64 | 76.68 (625 KB) | 73.93 (78125 KB) | 81.58 (45816 KB) | 77.81 (157 KB) |
| USPS-2 (DS6) | 94.42 | 95.72 | 96.11 (469 KB) | 96.71 (7291 KB) | 97.15 (1672 KB) | 95.86 (504 KB) |
| MNIST-2 (DS7) | 94.38 | 96.47 | 98.24 (94 KB) | 96.93 (183750 KB) | 97.45 (32187 KB) | 98.42 (307 KB) |

TABLE 3

| | Multi-Class Datasets | | | | |
|---|---|---|---|---|---|
| DATASET | BONSAI (%) | GBDT(%) | kNN(%) | RBF-SVM(%) | NEURALNET (%) |
| CHARS4K-62 | 58.59 (101 KB) | 42.51 (7267 KB) | 39.32 (6870 KB) | 43.29 (6690 KB) | 55.35 (1266 KB) |
| CURET-61 | 95.23 (115 KB) | 86.53 (3574 KB) | 89.81 (10017 KB) | 95.10 (6953 KB) | 95.51 (1310 KB) |
| MNIST-10 | 97.01 (84 KB) | 98.09 (4687 KB) | 97.06 (183750 KB) | 98.60 (30204 KB) | 98.54 (2795 KB) |

The results in Tables 2 and 3 demonstrate that prediction accuracies may compete with those of uncompressed kNN, GBDT, RBF-SVM and neural network classifiers with significantly larger model sizes. On Chars4K–62 and RTWhale-2, accuracies were higher than all other methods by at least 3.2% and 2.3% while its model size was lower by 13× and 121× respectively. On CURT-61 and Chars4K–2, accuracies were as good as those of the best uncompressed method (neural networks and RBF-SVMs) but with model sizes that were 11× and 366× lower respectively, accuracies were slightly lower on the other datasets with model size gains varying from 6× to 39062×. Note that, while accuracies were the same for systems and methods disclosed herein, its model sizes would be even lower.

Further results regarding the prediction accuracies of devices, systems, and methods discussed herein are provided in India provisional patent application number 201741010547, titled "RESOURCE-EFFICIENT MACHINE LEARNING" and filed on Mar. 24, 2017, which is incorporated herein by reference in its entirety.

In further implementation of the systems and methods disclosed herein, the tree based mechanism may generalize other scenarios by ranking documents in response to queries on a search engine, for example. The systems and methods disclosed herein may be trained by replacing the classification gradients with rank-sensitive gradients approximating nDCG.

The contribution of the systems and methods of the present disclosure on the Chars4K–2 dataset is presented in Table 4. Modest reductions in accuracy were observed without proper initialization or retraining. Learning a projection matrix independently via sparse Principal Component Analysis (PCA) before training reduced accuracy significantly as compared to joint training of the projection matrix and tree parameters resulting from the systems and methods disclosed herein. Other tree and uncompressed methods also did not benefit much by training in the sparse PCA space.

| METHOD | ACCURACY (%) | MODEL SIZE (KB) |
|---|---|---|
| BONSAI WITH RANDOM INIT. WITHOUT RETRAIN | 74.12 | 16 |
| BONSAI WITHOUT RETRAIN | 75.19 | 16 |
| BONSAI | 76.67 | 16 |
| BONSAI WITH SPARSEPCA | 58.32 | 16 |
| TREE PRUNING WITH SPARSEPCA | 63.57 | 16 |
| DECISION JUNGLE WITH SPARSEPCA | 61.67 | 16 |
| RBF-SVM WITH SPARSEPCA | 71.10 | 136 |

Further, Table 5 presents the prediction costs per test point for the highest accuracy models with size less than 2 KB for a few methods that were implemented on the Arduino Uno. The optimized model may ensure a more efficient implementation of the chosen model. The results indicate that the optimized method implemented on systems and methods disclosed herein may be significantly more accurate, faster and energy-efficient as compared to other computer implemented methods including an unoptimized linear classifier. Transmitting the test feature vector to the cloud, whenever possible, and running uncompressed Gradient Boosted Decision Tree (GBDT) might sometimes yield higher accuracies but would also consume 47×-497× more energy which might not be feasible.

TABLE 5

PREDICTION COSTS PER TEST POINT

| DATASET | PARAMETER | BONSAI OPT | BONSAI | LINEAR | LDKL |
|---|---|---|---|---|---|
| DS3 | MODEL SIZE (KB) | 0.30 | 1.20 | 2.00 | 1.88 |
|  | ACCURACY (%) | 88.78 | 88.26 | 80.10 | 66.33 |
|  | PRED. TIME (ms) | 10.75 | 12.26 | 15.13 | 15.80 |
|  | PRED. ENERGY (mJ) | 2.64 | 3.01 | 3.72 | 3.89 |
| DS1 | MODEL SIZE (KB) | 0.33 | 1.32 | 0.86 | 1.00 |
|  | ACCURACY (%) | 60.94 | 61.74 | 50.76 | 52.79 |
|  | PRED. TIME (ms) | 5.24 | 7.11 | 4.68 | 6.16 |
|  | PRED. ENERGY (mJ) | 1.29 | 1.75 | 1.15 | 1.52 |
| DS2 | MODEL SIZE (KB) | 0.50 | 2.00 | 1.56 | 1.95 |
|  | ACCURACY (%) | 74.71 | 74.28 | 51.06 | 69.78 |
|  | PRED. TIME (ms) | 4.21 | 8.55 | 7.39 | 8.61 |
|  | PRED. ENERGY (mJ) | 1.03 | 2.10 | 1.81 | 2.13 |
| DS4 | MODEL SIZE (KB) | 0.47 | 1.86 | 1.99 | 1.99 |
|  | ACCURACY (%) | 95.70 | 95.86 | 87.57 | 89.64 |
|  | PRED. TIME (ms) | 4.85 | 8.13 | 7.48 | 9.99 |
|  | PRED. ENERGY (mJ) | 1.18 | 1.99 | 1.84 | 2.47 |
| DS5 | MODEL SIZE (KB) | 0.50 | 1.98 | 1.56 | 1.88 |
|  | ACCURACY (%) | 73.05 | 73.02 | 69.11 | 67.61 |
|  | PRED. TIME (ms) | 4.55 | 8.16 | 7.73 | 8.12 |
|  | PRED. ENERGY (mJ) | 1.11 | 2.01 | 1.90 | 2.00 |
| DS6 | MODEL SIZE (KB) | 0.50 | 2.00 | 1.02 | 1.87 |
|  | ACCURACY (%) | 94.42 | 94.42 | 83.11 | 92.22 |
|  | PRED. TIME (ms) | 2.93 | 5.57 | 4.15 | 5.59 |
|  | PRED. ENERGY (mJ) | 0.71 | 1.37 | 1.02 | 1.37 |
| DS7 | MODEL SIZE (KB) | 0.49 | 1.96 | 1.93 | 1.87 |
|  | ACCURACY (%) | 94.28 | 94.38 | 86.16 | 87.93 |
|  | PRED. TIME (ms) | 5.17 | 8.90 | 6.72 | 8.72 |
|  | PRED. ENERGY (mJ) | 1.27 | 2.18 | 1.65 | 2.16 |

| DATASET | PARAMETER | NEURALNET PRUNING | CLOUD GBDT |
|---|---|---|---|
| DS3 | MODEL SIZE (KB) | 1.96 | 586.00 |
|  | ACCURACY (%) | 81.24 | 84.18 |
|  | PRED. TIME (ms) | 15.48 | 2186.59 |
|  | PRED. ENERGY (mJ) | 3.81 | 1311.95 |

TABLE 5-continued

| | PREDICTION COSTS PER TEST POINT | | |
|---|---|---|---|
| DS1 | MODEL SIZE (KB) | 1.17 | 156.00 |
| | ACCURACY (%) | 51.39 | 59.40 |
| | PRED. TIME (ms) | 8.86 | 521.27 |
| | PRED. ENERGY (mJ) | 2.18 | 312.76 |
| DS2 | MODEL SIZE (KB) | 1.96 | 125.00 |
| | ACCURACY (%) | 59.34 | 73.49 |
| | PRED. TIME (ms) | 14.09 | 160.40 |
| | PRED. ENERGY (mJ) | 3.48 | 63.52 |
| DS4 | MODEL SIZE (KB) | 1.91 | 93.75 |
| | ACCURACY (%) | 91.76 | 98.03 |
| | PRED. TIME (ms) | 14.22 | 293.13 |
| | PRED. ENERGY (mJ) | 3.49 | 116.08 |
| DS5 | MODEL SIZE (KB) | 1.96 | 625.00 |
| | ACCURACY (%) | 67.81 | 76.68 |
| | PRED. TIME (ms) | 13.87 | 160.40 |
| | PRED. ENERGY (mJ) | 3.43 | 63.52 |
| DS6 | MODEL SIZE (KB) | 2.00 | 468.75 |
| | ACCURACY (%) | 88.68 | 96.11 |
| | PRED. TIME (ms) | 9.51 | 83.45 |
| | PRED. ENERGY (mJ) | 2.33 | 33.05 |
| DS7 | MODEL SIZE (KB) | 1.90 | 93.75 |
| | ACCURACY (%) | 87.83 | 98.24 |
| | PRED. TIME (ms) | 14.67 | 264.96 |
| | PRED. ENERGY (mJ) | 3.59 | 104.92 |

In Table 5, prediction costs per test point on an Arduino Uno running BonsaiOpt/Bonsai are compared to other prediction models. BonsaiOpt, per the tests, is more accurate, faster, and more energy efficient than other models. Transmitting the test feature vector to the cloud, whenever possible, and running uncompressed GBDT might sometimes yield higher accuracies, but may also consume more energy (e.g., 47x-497x) which might not be feasible in many applications, such as IoT applications.

The systems and methods of the present disclosure proposes a paradigm, centric to the device rather than the cloud, where ML models run on devices without necessarily connecting to the cloud thereby engendering local decision making capabilities. The tree learner based systems and accompanying methods of the present disclosure are fast, accurate, compact and energy efficient at prediction time, as compared to previous prediction techniques. The systems and methods disclosed herein may be deployed on the Arduino Uno board as it could fit in a few KB of flash, required only 70 bytes of writable memory for binary classification and 500 bytes for a 62-class problem, handled streaming features and made predictions in milliseconds taking only millijoules of energy. The prediction accuracies resulting from systems and methods of the present disclosure could be as much as 30% higher as compared to already existing resource-efficient ML computer implemented methods for a fixed model size and could even approach and outperform those of uncompressed models taking many MB of RAM. The systems and methods disclosed herein achieved these gains by developing a model based on a single, shallow, sparse tree learnt in a low-dimensional space. Predictions made by both internal and leaf nodes and the sharing of parameters along paths allowed the systems and methods disclosed herein to learn complex non-linear decision boundaries using a compact representation.

Figure 3:
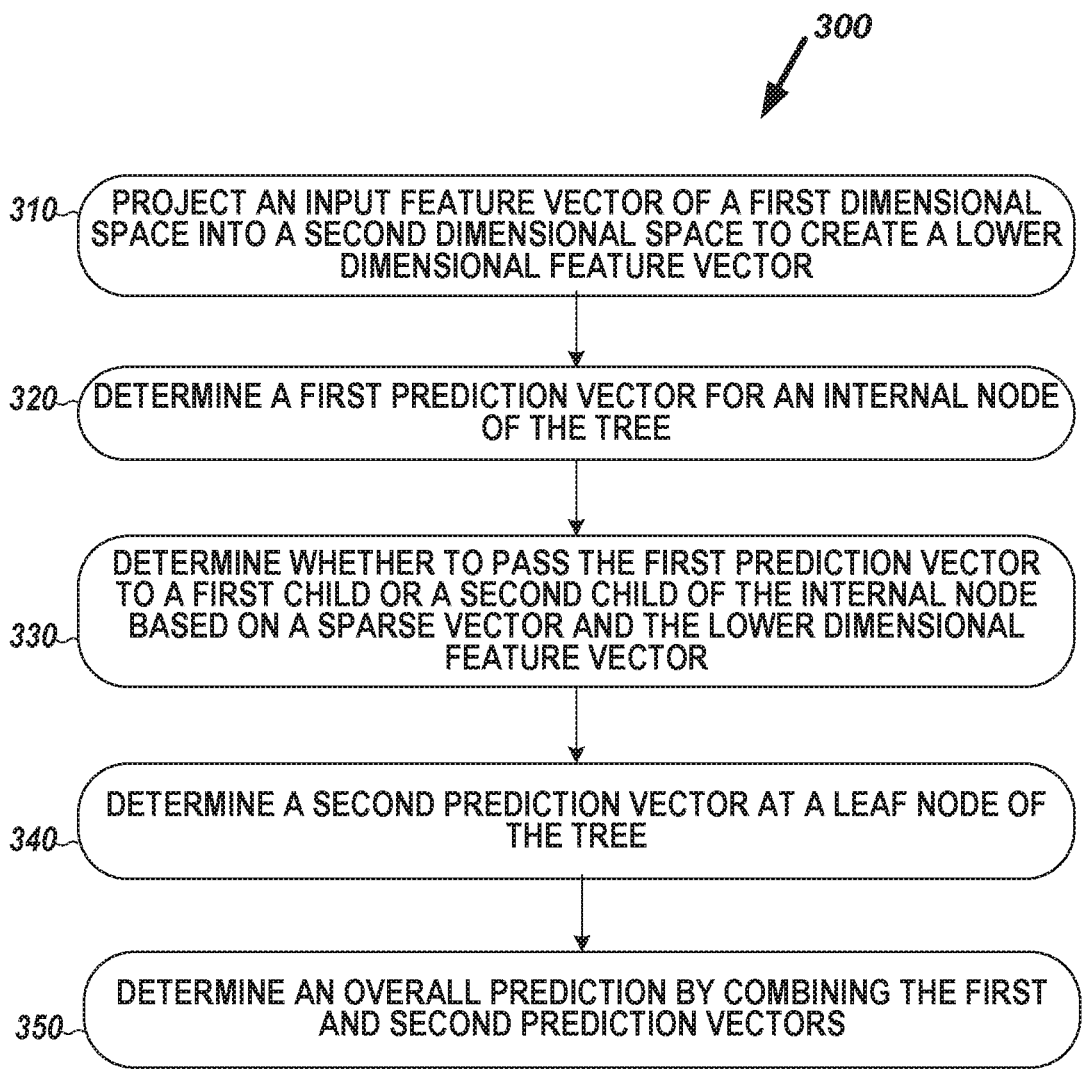
FIG. 3 illustrates, by way of example, a diagram of another embodiment of a method for prediction or decision making.

FIG. 3 illustrates, by way of example, an embodiment of a method 300 for making, using a computing device, a prediction and/or decision. The method 300 may be performed by one or more components of the training system 150 and/or prediction system 100. The prediction or decision may be provided to an external device, such as by circuitry of the device, to be used in analytics, or otherwise cause a device or person to perform an operation. The method 300 as illustrated includes projecting an input feature vector of a first dimensional space into a second dimensional space to create a lower dimensional feature vector, the second dimensional space smaller than the first dimensional space, at operation 310; determining a first prediction vector for an internal node of the tree, at operation 320; determining whether to pass the first prediction vector to a first child or a second child of the internal node based on a sparse vector and the lower dimensional feature vector, at operation 330; determining a second prediction vector at a leaf node of the tree, at operation 340; and determining an overall prediction by combining the first and second prediction vectors, at operation 350.

The operation 310 may be performed using a projection matrix stored on a memory of the device. The operation 320 may include multiplying a first predictor matrix, of the internal node, transposed and the projection matrix and multiplying a second predictor matrix, of the internal node, transposed and the projection matrix. The operation 340 may include multiplying a first predictor matrix, of the leaf node, transposed and the projection matrix and multiplying a second predictor matrix, of the leaf node, transposed and the projection matrix.

The operation 320 may include, wherein the determination of whether to pass the prediction vector to the first child or the second child includes, in response to a determination that a sign of the sparse vector times the lower dimensional feature vector is positive, passing the first prediction vector to the first child, and in response to a determination that the sign of the sparse vector times the lower dimensional feature vector is negative, passing the first prediction vector to the second child. The method 300 may further include, wherein the method includes using only fixed point operations of the processor.

The operation 320 may further include, wherein the determining the first prediction vector includes: prediction vector=$W^T \hat{x} \circ \tan h(\sigma V^T \hat{x})$ where $\circ$ denotes an elementwise Had product, $\sigma$ is a user-tunable parameter, W is the first predictor matrix, V is the second predictor matrix, and $\hat{x}$ is the lower dimensional feature vector. The function, $\tan h( )$ may be approximated as the lower dimensional input feature vector for input feature vectors with size less than one and as signum (lower dimensional input feature vector) otherwise. The method 300 may further include initializing the user-tunable parameter to allow multiple paths to be traversed higher in the tree and only one path to be traversed lower in the tree. The method 300 may further include training the projection matrix, first predictor matrix of all nodes of the tree, second predictor matrix of all nodes of the tree, and the sparse vector of all internal nodes of the tree simultaneously.

The method 300 may further include, wherein the tree is a binary tree, with height h, $2^h-1$ internal nodes, and $2^h$ leaf nodes. The method 300 may further include, wherein the projection matrix is stored on the medium. The method 300 may further include, wherein the input feature vector consumes more memory than the storage capacity of the medium and wherein the medium includes less than one megabyte of total storage space.

Figure 4:
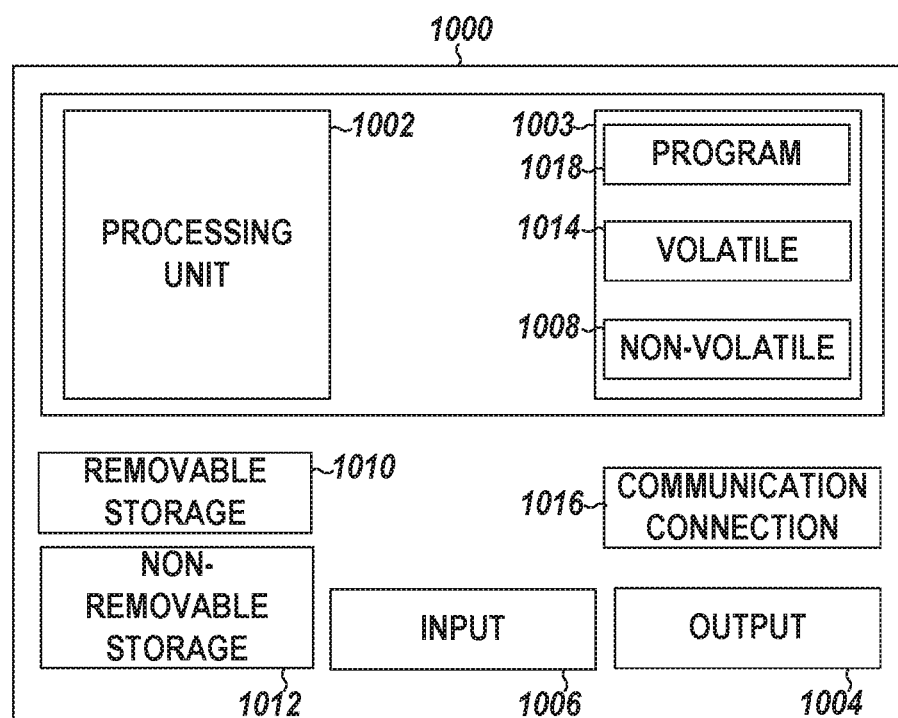
FIG. 4 illustrates, by way of example, a diagram of an embodiment of a machine, on which methods discussed herein may be carried out.

FIG. 4 illustrates, by way of example, a block diagram of an embodiment of a machine 1000 (e.g., a computer system) to implement prediction or decision making process (e.g., one or more of training and prediction) as discussed herein. One example machine 1000 (in the form of a computer), may include a processing unit 1002, memory 1003, removable storage 1010, and non-removable storage 1012. Although the example computing device is illustrated and described as machine 1000, the computing device may be in different forms in different embodiments. For example, the computing device may instead be a smartphone, a tablet, smartwatch, or other computing device including the same or similar elements as illustrated and described regarding FIG. 4. Devices such as smartphones, tablets, and smartwatches are generally collectively referred to as mobile devices. Further, although the various data storage elements are illustrated as part of the machine 1000, the storage may also or alternatively include cloud-based storage accessible via a network, such as the Internet. One or more of the components of the prediction system 100 and/or training system 150 may be implemented using, or include, one or more components of the machine 1000.

Memory 1003 may include volatile memory 1014 and non-volatile memory 1008. The machine 1000 may include—or have access to a computing environment that includes—a variety of computer-readable media, such as volatile memory 1014 and non-volatile memory 1008, removable storage 1010 and non-removable storage 1012. Computer storage includes random access memory (RAM), read only memory (ROM), erasable programmable read-only memory (EPROM) & electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices capable of storing computer-readable instructions for execution to perform functions described herein.

The machine 1000 may include or have access to a computing environment that includes input 1006, output 1004, and a communication connection 1016. Output 1004 may include a display device, such as a touchscreen, that also may serve as an input device. The input 1006 may include one or more of a touchscreen, touchpad, mouse, keyboard, camera, one or more device-specific buttons, one or more sensors integrated within or coupled via wired or wireless data connections to the machine 1000, and other input devices. The computer may operate in a networked environment using a communication connection to connect to one or more remote computers, such as database servers, including cloud based servers and storage. The remote computer may include a personal computer (PC), server, router, network PC, a peer device or another common network node, or the like. The communication connection may include a Local Area Network (LAN), a Wide Area Network (WAN), cellular, Institute of Electrical and Electronics Engineers (IEEE) 802.11 (Wi-Fi), Bluetooth, or other networks.

Computer-readable instructions stored on a computer-readable storage device are executable by the processing unit 1002 of the machine 1000. A hard drive, CD-ROM, and RAM are some examples of articles including a non-transitory computer-readable medium such as a storage device. For example, a computer program 1018 may be used to cause processing unit 1002 to perform one or more methods or algorithms described herein.

ADDITIONAL NOTES AND EXAMPLES

Example 1 includes a device comprising a processor, a memory device coupled to the processor, the memory device including a program stored thereon for execution by the processor to perform operations, the operations comprising: projecting, an input feature vector of a first dimensional space into a second dimensional space, using a projection matrix, to create a lower dimensional feature vector, the second dimensional space smaller than the first dimensional space, determining a first prediction vector for an internal node of the tree, including multiplying a first predictor matrix, of the internal node, transposed and the projection matrix and multiplying a second predictor matrix, of the internal node, transposed and the projection matrix, determining whether to pass the first prediction vector to a first child or a second child of the internal node based on a sparse vector and the lower dimensional feature vector, determining a second prediction vector at a leaf node of the tree, including multiplying a first predictor matrix, of the leaf node, transposed and the projection matrix and multiplying a second predictor matrix, of the leaf node, transposed and the projection matrix, and determining an overall prediction by combining the first and second prediction vectors.

In Example 2, Example 1 may further include, Wherein the determination of whether to pass the prediction vector to the first child or the second child includes, in response to a determination that a sign of the sparse vector times the lower dimensional feature vector is positive, passing the first prediction vector to the first child, and in response to a determination that the sign of the sparse vector times the lower dimensional feature vector is negative, passing the first prediction vector to the second child.

In Example 3, at least one of Examples 1-2 may further include, wherein, the operations include using only fixed point operations.

In Example 4, at least one of Examples 1-2 may further include, wherein the determining the first prediction vector includes: prediction vector=$W^T\hat{x} \circ \tan h(\sigma V^T \hat{x})$ where $\circ$ denotes an elementwise Hadamard product, $\sigma$ is a user-tunable parameter, W is the first predictor matrix, V is the second predictor matrix, and $\hat{x}$ is the lower dimensional feature vector.

In Example 5, Example 4 may further include, wherein tan h( ) is approximated as the lower dimensional input feature vector for input feature vectors with size less than one and as signum (lower dimensional input feature vector) otherwise, and the operations further comprise initializing the user-tunable parameter to allow multiple paths to be traversed higher in the tree and only one path to be traversed lower in the tree.

In Example 6, at least one of Examples 1-5 may further include, wherein the operations further comprise training the projection matrix, first predictor matrix of all nodes of the tree, second predictor matrix of all nodes of the tree, and the sparse vector of all internal nodes of the tree simultaneously.

In Example 7, Example 6 may further include, wherein the tree is a binary tree, with height h, $2^h-1$ internal nodes, and $2^h$ leaf nodes.

In Example 8, at least one of Examples 1-7 may further include, wherein the projection matrix is stored on the memory device.

In Example 9, Example 8 may further include, wherein the input feature vector consumes more memory than the storage capacity of the memory device.

In Example 10, Example 9 may further include, wherein the memory device includes less than one megabyte of total storage space.

Example 11 includes a method of making a prediction using a device, the method comprising projecting, using a processor of a device, an input feature vector of a first dimensional space into a second dimensional space, using a projection matrix stored on a memory of the device, to create a lower dimensional feature vector, the second dimensional space smaller than the first dimensional space, determining a first prediction vector for an internal node of the tree, including multiplying a first predictor matrix, of the internal node, transposed and the projection matrix and multiplying a second predictor matrix, of the internal node, transposed and the projection matrix, determining whether to pass the first prediction vector to a first child or a second child of the internal node based on a sparse vector and the lower dimensional feature vector, determining a second prediction vector at a leaf node of the tree, including multiplying a first predictor matrix, of the leaf node, transposed and the projection matrix and multiplying a second predictor matrix, of the leaf node, transposed and the projection matrix, and determining an overall prediction by combining the first and second prediction vectors.

In Example 12, Example 11 may further include, wherein the determination of whether to pass the prediction vector to the first child or the second child includes, in response to a determination that a sign of the sparse vector times the lower dimensional feature vector is positive, passing the first prediction vector to the first child, and in response to a determination that the sign of the sparse vector times the lower dimensional feature vector is negative, passing the first prediction vector to the second child.

In Example 13, at least one of Examples 11-12 may further include, wherein the method includes using only fixed point operations of the processor.

In Example 14, at least one of Examples 11-13 may further include, wherein the determining the first prediction vector includes: prediction vector=$W^T \hat{x} \circ \tan h(\sigma V^T \hat{x})$ where ∘ denotes an elementwise Hadamard product, σ is a user-tunable parameter, W is the first predictor matrix, V is the second predictor matrix, and $\hat{x}$ is the lower dimensional feature vector.

In Example 15, at least one of Examples 11-14 may further include, wherein tan h( ) is approximated as the lower dimensional input feature vector for input feature vectors with size less than one and as signum (lower dimensional input feature vector) otherwise, and the method further comprises initializing the user-tunable parameter to allow multiple paths to be traversed higher in the tree and only one path to be traversed lower in the tree.

Example 16 includes a non-transitory machine-readable medium including instructions for execution by a processor of the machine to perform operations comprising projecting an input feature vector of a first dimensional space into a second dimensional space, using a projection matrix, to create a lower dimensional feature vector, the second dimensional space smaller than the first dimensional space, determining a first prediction vector for an internal node of the tree, including multiplying a first predictor matrix, of the internal node, transposed and the projection matrix and multiplying a second predictor matrix, of the internal node, transposed and the projection matrix, determining whether to pass the first prediction vector to a first child or a second child of the internal node based on a sparse vector and the lower dimensional feature vector, determining a second prediction vector at a leaf node of the tree, including multiplying a first predictor matrix, of the leaf node, transposed and the projection matrix and multiplying a second predictor matrix, of the leaf node, transposed and the projection matrix, and determining an overall prediction by combining the first and second prediction vectors.

In Example 17, Example 16 may further include, wherein the operations further comprise training the projection matrix, first predictor matrix of all nodes of the tree, second predictor matrix of all nodes of the tree, and the sparse vector of all internal nodes of the tree simultaneously.

In Example 18, at least one of Examples 16-17 may further include, wherein the tree is a binary tree, with height h, $2^h-1$ internal nodes, and $2^h$ leaf nodes.

In Example 19, at least one of Example 16-18 may further include, wherein the projection matrix is stored on the medium.

In Example 20, Example 19 may further include, wherein the input feature vector consumes more memory than the storage capacity of the medium and wherein the medium includes less than one megabyte of total storage space.

Although a few embodiments have been described in detail above, other modifications are possible. For example, the logic flows depicted in the figures do not require the order shown, or sequential order, to achieve desirable results. Other steps may be provided, or steps may be eliminated, from the described flows, and other components may be added to, or removed from, the described systems. Other embodiments may be within the scope of the following claims.

What is claimed is:

1. A device comprising:
   a processor;
   a memory device coupled to the processor, the memory device including a program stored thereon for execution by the processor to perform operations, the operations comprising:
   projecting, an input feature vector of a first dimensional space into a second dimensional space, using a projection matrix, to create a lower dimensional feature vector, the second dimensional space smaller than the first dimensional space;
   determining a first prediction vector for an internal node of a tree, including multiplying a learned first predictor matrix of the internal node transposed and the projection matrix and multiplying a learned second predictor matrix of the internal node transposed and the projection matrix;
   determining whether to pass the first prediction vector to a first child or a second child of the internal node based on whether a mathematical combination of a learned a sparse vector and the lower dimensional feature vector is greater than a threshold;

determining a second prediction vector for a leaf node of the tree, including multiplying a learned first predictor matrix of the leaf node transposed and the projection matrix and multiplying a learned second predictor matrix of the leaf node transposed and the projection matrix; and determining an overall prediction by mathematically combining the first and second prediction vectors.

2. The device of claim 1, wherein the determination of whether to pass the prediction vector to the first child or the second child includes, in response to a determination that a sign of the sparse vector times the lower dimensional feature vector is positive, passing the first prediction vector to the first child, and in response to a determination that the sign of the sparse vector times the lower dimensional feature vector is negative, passing the first prediction vector to the second child.

3. The device of claim 1, wherein, the operations include using only fixed point operations.

4. The device of claim 1, wherein the determining the first prediction vector includes: prediction vector=$W^T\hat{x} \circ \tan h(\sigma V^T \hat{x})$ where $\circ$ denotes an elementwise Hadamard product, $\sigma$ is a user-tunable parameter, W is the learned first predictor matrix, V is the second learned predictor matrix, and $\hat{x}$ is the lower dimensional feature vector.

5. The device of claim 4, wherein tan h( ) is approximated as the lower dimensional input feature vector for input feature vectors with size less than one and as signum (lower dimensional input feature vector) otherwise; and the operations further comprise initializing the user-tunable parameter to allow multiple paths to be traversed higher in the tree and only one path to be traversed lower in the tree.

6. The device of claim 1, wherein the operations further comprise training the projection matrix, learned first predictor matrix of all nodes of the tree, learned second predictor matrix of all nodes of the tree, and the sparse vector of all internal nodes of the tree simultaneously.

7. The device of claim 6, wherein the tree is a binary tree, with height h, $2^h-1$ internal nodes, and $2^h$ leaf nodes.

8. The device of claim 1, wherein the projection matrix is stored on the memory, device.

9. The device of claim 8, wherein the input feature vector consumes more memory than the storage capacity of the memory device.

10. The device of claim 9, wherein the memory device includes less than one megabyte of total storage space.

11. A method of making a prediction, the method comprising:

training, using a first device, a projection matrix, a first predictor matrix, a second predictor matrix, and a sparse vector, simultaneously, wherein the projection matrix, the first predictor matrix, the second predictor matrix, and the sparse vector are sparse matrices;

compressing, using the first device, the sparse matrices;

storing the sparse matrices on a random access memory of a second device;

projecting, using a processor of the second device, an input feature vector of a first dimensional space into a second dimensional space, using a projection matrix stored on a memory of the device, to create a lower dimensional feature vector, the second dimensional space smaller than the first dimensional space;

determining a first prediction vector for an internal node of a tree, including multiplying a learned first predictor matrix of the internal node transposed and the projection matrix and multiplying a learned second predictor matrix of the internal node transposed and the projection matrix;

determining whether to pass the first prediction vector to a first child or a second child of the internal node based on whether a mathematical combination of a learned sparse vector and the lower dimensional feature vector is greater than a threshold;

determining a second prediction vector for a leaf node of the tree, including multiplying a learned first predictor matrix of the leaf node transposed and the projection matrix and multiplying a learned second predictor matrix of the leaf node transposed and the projection matrix; and determining an overall prediction by mathematically combining the first and second prediction vectors.

12. The method of claim 11, wherein the determination of whether to pass the prediction vector to the first child or the second child includes, in response to a determination that a sign of the sparse vector times the lower dimensional feature vector is positive, passing the first prediction vector to the first child, and in response to a determination that the sign of the sparse vector times the lower dimensional feature vector is negative, passing the first prediction vector to the second child.

13. The method of claim 11, wherein the method includes using only fixed point operations of the processor.

14. The method of claim 11, wherein the determining the first prediction vector includes: prediction vector=$W^T\hat{x} \circ \tan h(\sigma V^T \hat{x})$ where $\circ$ denotes an elementwise Hadamard product, $\sigma$ is a user-tunable parameter, this the first predictor matrix, V is the second predictor matrix, and $\hat{x}$ is the lower dimensional feature vector.

15. The method of claim 14, wherein tan h( ) is approximated as the lower dimensional input feature vector for input feature vectors with size less than one and as signum (lower dimensional input feature vector) otherwise; and the method further comprises initializing the user-tunable parameter to allow multiple paths to be traversed higher in the tree and only one path to be traversed lower in the tree.

16. A non-transitory machine-readable medium including instructions for execution by a processor of the machine to perform operations comprising:

projecting an input feature vector of a first dimensional space into a second dimensional space, using a projection matrix, to create a lower dimensional feature vector, the second dimensional space smaller than the first dimensional space, the input feature vector including pixel values of an image;

determining a first prediction vector for an internal node of a tree, including multiplying a learned first predictor matrix of the internal node transposed and the projection matrix and multiplying a learned second predictor matrix of the internal node transposed and the projection matrix;

determining whether to pass the first prediction vector to a first child or a second child of the internal node based on whether a mathematical combination of a learned sparse vector and the lower dimensional feature vector is greater than a threshold;

determining a second prediction vector for a leaf node of the tree, including multiplying a learned first predictor matrix of the leaf node transposed and the projection matrix and multiplying a learned second predictor matrix of the leaf node transposed and the projection matrix; and determining an overall prediction by mathematically combining the first and second prediction vectors, the overall prediction including what characters and/or numbers are present in the image.

17. The non-transitory machine-readable medium of claim 16, wherein the operations further comprise training the projection matrix, first predictor matrix of all nodes of the tree, second predictor matrix of all nodes of the tree, and the sparse vector of all internal nodes of the tree simultaneously.

18. The non-transitory machine-readable medium of claim 16, wherein the tree is a binary tree, with height h, $2^h-1$ internal nodes, and $2^h$ leaf nodes.

19. The non-transitory machine-readable medium of claim 16, wherein the projection matrix is stored on the medium.

20. The non-transitory machine-readable medium of claim 19, wherein the input feature vector consumes more memory than the storage capacity of the medium and wherein the medium includes less than one megabyte of total storage space.

\* \* \* \* \*